(12) United States Patent
Ahn

(10) Patent No.: US 10,069,120 B2
(45) Date of Patent: Sep. 4, 2018

(54) BATTERY MODULE

(71) Applicant: SAMSUNG SDI CO., LTD., Yongin-si, Gyeonggi-do (KR)

(72) Inventor: Sang Kyu Ahn, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 142 days.

(21) Appl. No.: 15/084,791

(22) Filed: Mar. 30, 2016

(65) Prior Publication Data

US 2017/0054115 A1 Feb. 23, 2017

(30) Foreign Application Priority Data

Aug. 18, 2015 (KR) .......................... 10-2015-0116073

(51) Int. Cl.
| | |
|---|---|
| *H01M 2/06* | (2006.01) |
| *H01M 2/30* | (2006.01) |
| *H01M 2/20* | (2006.01) |
| *H01M 2/12* | (2006.01) |
| *H01M 2/10* | (2006.01) |

(52) U.S. Cl.
CPC ........... *H01M 2/06* (2013.01); *H01M 2/1022* (2013.01); *H01M 2/1077* (2013.01); *H01M 2/12* (2013.01); *H01M 2/204* (2013.01); *H01M 2/206* (2013.01); *H01M 2/30* (2013.01)

(58) Field of Classification Search
CPC ........ H01M 2/06; H01M 2/12; H01M 2/1077; H01M 2/1022; H01M 2/204; H01M 2/30; H01M 2/206
See application file for complete search history.

(56) References Cited

U.S. PATENT DOCUMENTS

| | | | | |
|---|---|---|---|---|
| 2010/0215998 A1* | 8/2010 | Byun | .................. | H01M 2/1077 429/82 |
| 2012/0114991 A1* | 5/2012 | Park | .................... | H01M 2/1077 429/82 |
| 2013/0266833 A1 | 10/2013 | Kim | | |
| 2014/0017533 A1 | 1/2014 | Nishihara et al. | | |

FOREIGN PATENT DOCUMENTS

| | | |
|---|---|---|
| KR | 10-2013-0114419 A | 10/2013 |
| WO | WO 2012/131809 A1 | 10/2012 |

* cited by examiner

*Primary Examiner* — Osei K Amponsah
(74) *Attorney, Agent, or Firm* — Lee & Morse, P.C.

(57) ABSTRACT

A battery module includes a battery block including a plurality of battery cells, each including a positive electrode terminal and a negative electrode terminal, and a vent between the positive electrode terminal and the negative electrode terminal and a middle cover including a plurality of bus-bars at one edge and at an other edge of the middle cover, the middle cover being connectable to the positive and negative electrode terminals. The middle cover may include a first barrier and a second barrier located such that the vent is between the first barrier and the second barrier and a third barrier between the bus-bars located at the other edge and the second barrier.

10 Claims, 4 Drawing Sheets

BATTERY MODULE

CROSS-REFERENCE TO RELATED APPLICATION

Korean Patent Application No. 10-2015-0116073, filed on Aug. 18, 2015, in the Korean Intellectual Property Office, and entitled: "Battery Module," is incorporated by reference herein in its entirety.

BACKGROUND

1. Field

Embodiments relate to a battery module.

2. Description of the Related Art

In general, battery cells are used as energy sources for mobile devices, electric vehicles, hybrid vehicles, and the like. The shape of the battery cell may be variously changed depending on the kind of external device to which the battery cell is applied.

SUMMARY

Embodiments are directed to a battery module including a battery block including a plurality of battery cells, each including a positive electrode terminal and a negative electrode terminal, and a vent between the positive electrode terminal and the negative electrode terminal and a middle cover including a plurality of bus-bars at one edge and at an other edge of the middle cover, the middle cover being connectable to the positive and negative electrode terminals. The middle cover may include a first barrier and a second barrier located such that the vent is between the first barrier and the second barrier and a third barrier between the bus-bars located at the other edge and the second barrier.

The middle cover may include a predetermined space between the first and second barriers, the predetermined space exposing the vent therethrough, and the predetermined space providing a vent hole through which gas exhausted from the vent is exhaustible to the outside.

The battery module may further include at least one supporting portion that connects the first and second barriers to each other.

A space between the second and third barriers may provide a wire hole into which wires are insertable.

The third barrier may include a plurality of through-holes such that the wires from the bus-bars disposed at the other edge are insertable therethrough into the wire hole.

The battery module may further include a wire fixing portion that overlaps the wire hole, the wire fixing portion extending from at least one of the second and third barriers to define an opening into which the wires are insertable.

The battery module may include at least one wire supporting portion between the first and second barriers. The at least one wiring supporting portion may provide a connection path of the wires between the bus-bars located at the one edge and the wire hole.

The wire supporting portion may be in a form of a structure in which left, right, and bottom sides thereof are blocked and a top side thereof is open.

The bottom side of the wire supporting portion may be spaced apart from the battery block by a predetermined distance.

The battery module may further include a wire fixing portion that extends from a side surface of the wire supporting portion. The wire fixing portion may include an opening into which the wires are insertable.

The bus-bars of the middle cover may be fixed to the positive and negative electrode terminals by nuts.

The battery module may further include a housing accommodating the battery block, and an upper cover coupled to the housing at an upper portion of the middle cover by hooks.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
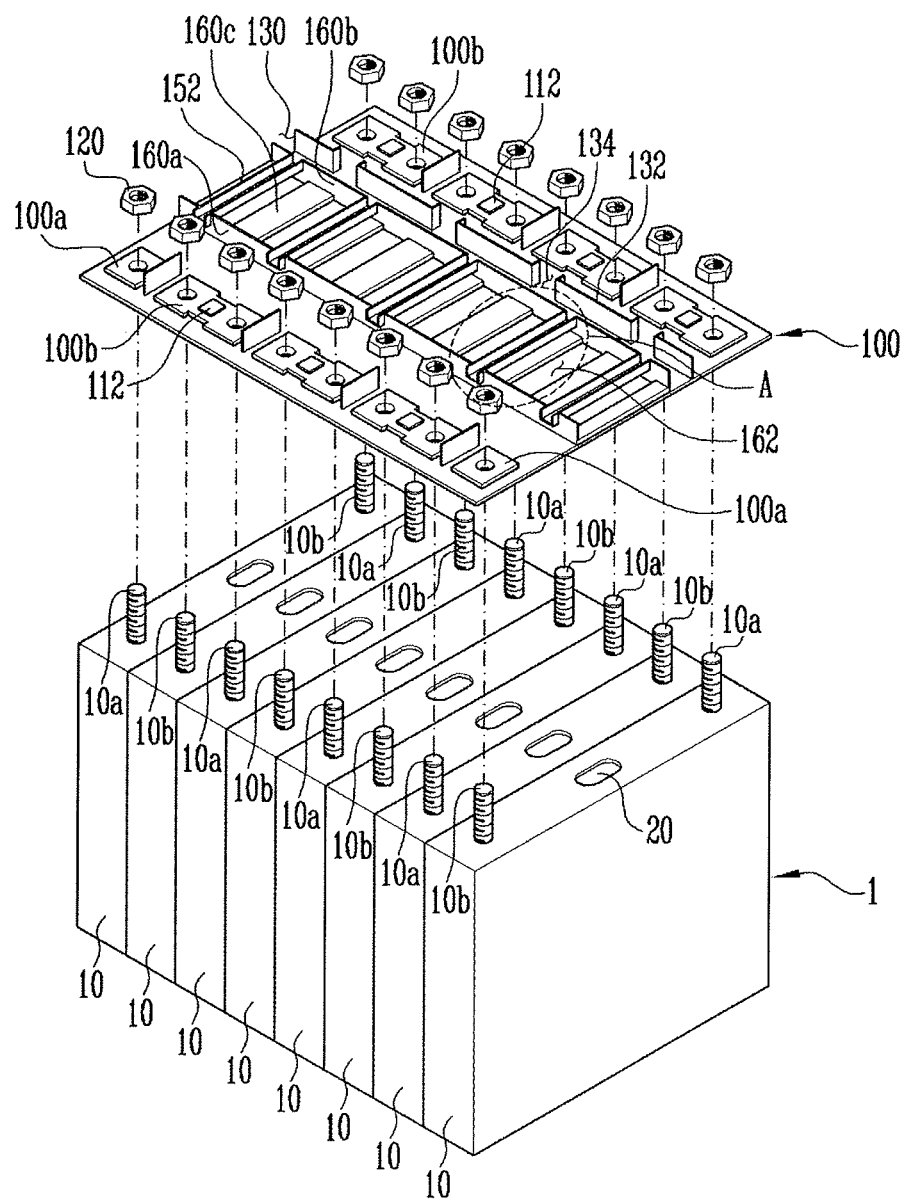
FIG. 1 illustrates a perspective view of a battery module according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
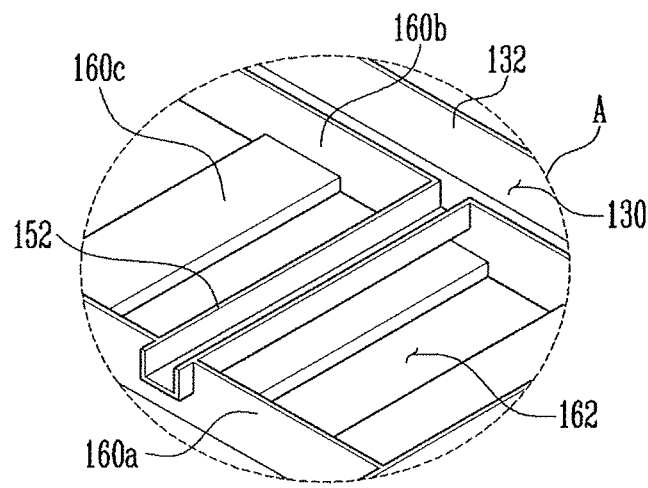
FIG. 2 illustrates an enlarged perspective view showing portion "A" of FIG. 1 according to the embodiment illustrated in FIG. 1.
Figure 3:
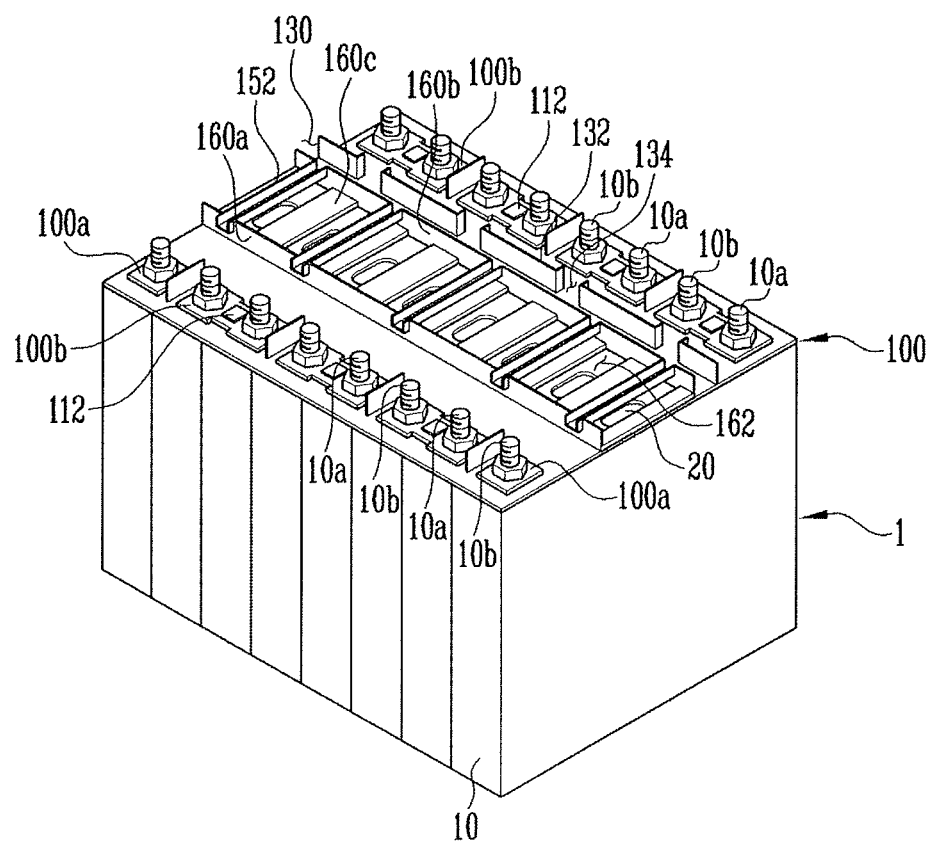
FIG. 3 illustrates a perspective view showing a state in which the battery module and a middle cover, shown in FIG. 1, are coupled to each other.

FIG. 1 illustrates a perspective view of a battery module according to an embodiment. FIG. 2 illustrates an enlarged perspective view showing portion "A" of FIG. 1 according to this embodiment. FIG. 3 illustrates a perspective view showing a state in which the battery module and a middle cover, shown in FIG. 1, are coupled to each other. Additionally, in FIG. 1, components such as an upper cover and a housing will be omitted for convenience of illustration.

Referring to FIGS. 1 to 3, the battery module may include a battery block 1 including a plurality of battery cells 10, and a middle cover 100 on which a plurality of bus-bars 100*a* and 100*b* are mounted.

The battery block 1 may include a plurality of battery cells 10. The battery block 1 may be configured such that the plurality of battery cells 10, having a rectangular parallelepiped shape, are arranged in one direction. Each battery cell 10 may include a battery case, and an electrode assembly and an electrolyte, which are accommodated in the battery case. The electrode assembly and the electrolyte may react with each other to generate electrochemical energy.

A vent 20 may be provided at the center of a top surface of the battery cell 10. If the pressure of gas generated inside the battery cell 10 reaches or exceeds a predetermined pressure, the vent 20 may serve as a path along which the gas is exhausted from the battery cell 10. Accordingly, the vent 20 may be prevent the battery cell 10 from being broken by an internal pressure.

A positive electrode terminal 10a and a negative electrode terminal 10b may be disposed on the top surface of the battery cell 10 with the vent interposed therebetween. Positive or negative electrode terminals 10a or 10b of adjacent battery cells 10 may be disposed in directions opposite to each other. For example, a positive electrode terminal 10a, a negative electrode terminal 10b, a positive electrode terminal 10a, and a negative electrode terminal 10b, etc., of adjacent battery cells 10 may be arranged along a first side (i.e., one edge) of the battery block 1, and a negative electrode terminal 10b, a positive electrode terminal 10a, a negative electrode terminal 10b, and a positive electrode terminal 10a, etc., of the adjacent battery cells 10 are arranged along a second side (i.e., the other edge) of the battery block 1. For example, positive and negative electrode terminals 10a and 10b may be alternately arranged at each of the first and second sides of the battery block 1.

The middle cover 100 may include bus-bars 100a and 100b, a temperature sensor 112, a first barrier 160a, a second barrier 160b, and a third barrier 132.

The bus-bars 100a and 100b may be formed of a conductive material such as nickel. The bus-bars 100a and 100b may include a first bus-bar 100a including one opening such that the first bus-bar 100a is connected to one terminal, and a second bus-bar 100b including two openings such that the second bus-bar 100b is connected two terminals.

The second bus-bar 100b may be coupled to positive and negative electrode terminals 10a, 10b of adjacent battery cells 10. For example, the second bus-bar 100b may allow the adjacent positive and negative electrode terminals 10a and 10b to be electrically connected to each other. When the adjacent positive and negative electrode terminals 10a and 10b are coupled to each other by the second bus-bar 100b, the battery cells 10 may be connected in series to each other.

In an implementation, the first bus-bar 100a located at the left side of a first side of the middle cover 100 may be coupled to a positive electrode terminal 10a, and the first bus-bar 100a located at the right side of the first side of the middle cover 100 may be coupled to a negative electrode terminal 10b. When the battery cells 10 are connected in series to each other, the positive electrode terminal 10a, which is located at the left side of the first side and coupled to the first bus-bar 100a, may be set as a positive electrode terminal of the battery block 1, and the negative electrode terminal 10b, which is located at the right side of the first side and coupled to the first bus-bar 100a, may be set as a negative electrode of the battery block 1. In some implementations, such as when an odd number of battery cells 10 are provided, the positive electrode terminal 10a may be at one side of one end of the battery block 1 and the negative electrode terminal 10b may be at an opposite side of an opposite end 1 of the battery block.

The positive and negative electrode terminals 10a and 10b of the battery block 1 may be connected to an external electronic device, etc. The bus-bars 100a and 100b may be fixed to the positive and negative electrode terminals 10a and 10b by members such as nuts 120.

The temperature sensor 112 may be attached to the second bus-bar 100b. The temperature sensor 112 may measure a temperature of the battery cell 10.

The first and second barriers 160a and 160b may be formed to have a predetermined height in a longitudinal direction with the vent 20 interposed therebetween. A predetermined space (i.e., a through-hole) may be located between the first and second barriers 160a and 160b such that the vent 20 is exposed when the middle cover 100 is coupled to the battery block 1. When the middle cover 100 is coupled to the battery block 1, a predetermined space may be located between the first and second barriers 160a and 160b. The predetermined space may provide a vent hole 162. The vent hole 162 may serve as a path along which gas exhausted from the vent 20 is exhausted to the outside.

Additionally, at least one supporting portion 160c may be formed between the first and second barriers 160a and 160b. The supporting portion 160c may be formed so as not to obstruct the flow of gas in the vent hole 162, and may provide a predetermined strength to the middle cover 100.

Figure 4:
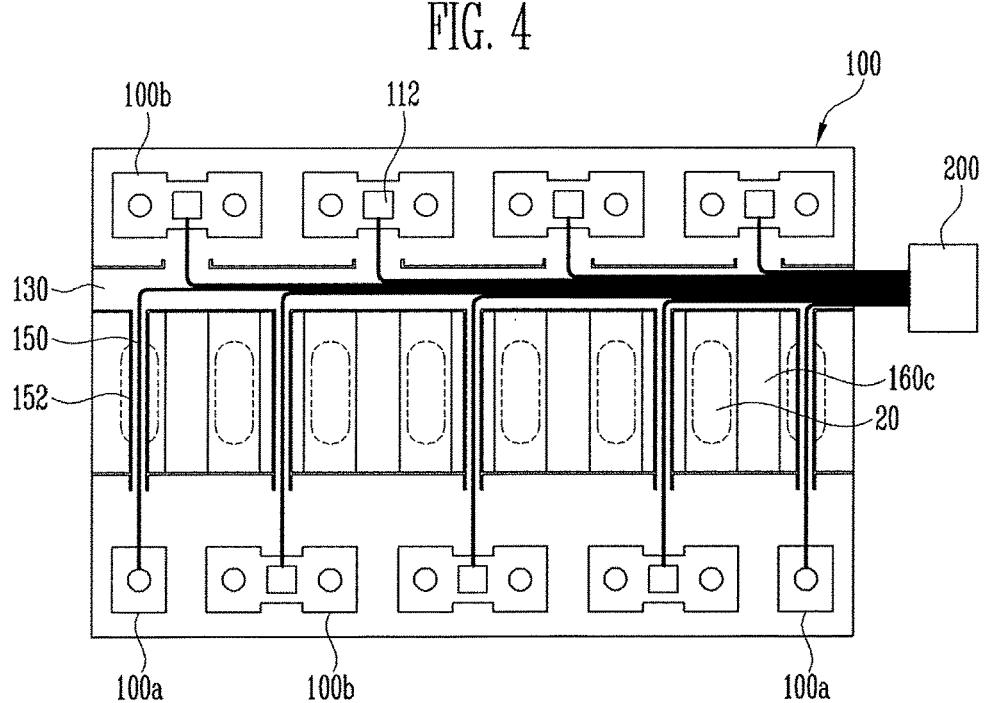
FIG. 4 illustrates a view showing wires connected by a wire hole and a wire supporting portion, shown in FIG. 1.

A third barrier 132 may be formed between the second barrier 160b and the second side of the middle cover 100. The space between the second barrier 160b and the third barrier 132 may be used as a wire hole 130 into which wires are inserted. As shown in FIG. 4, a plurality of wires 150 including voltage measuring wires from the bus-bars 100a and 100b, temperature measuring wires from the temperature sensors 112, or the like may be disposed in the wire hole 130. The plurality of wires 150 may be connected to an external connector 200 via the wire hole 130.

For example, the wire hole 130 having the wires 150 inserted thereinto may be located in an area that does not overlap the vent 20. Damage to the wires 150 in the event that gas is released by the vent may be minimized. The wires 150 may be fixed inside the wire hole 130, thereby ensuring stability.

The third barrier 132 may include a plurality of through-holes 134 through which wires 150 from the second bus-bars 100b located at the second side of the middle cover 100 may be inserted into the wire hole 130. For example, each through-hole 134 may be formed to correspond to a central portion of a respective second bus-bar 100b. The through-hole 134 may be formed in a suitable shape such that the wire 150 may be be inserted into the wire hole 130 from the second bus-bar 100b.

The battery module may include a plurality of wire supporting portions 152 that provide connection paths of the wires 150 such that the wires 150 from the first and second bus-bars 100a and 100b located at the first side of the middle cover 100 can be inserted into the wire hole 130.

Each of the wire supporting portions 152 may be formed to traverse the vent hole 162 in the direction from the first side to the second side of the middle cover 100. The wire supporting portion 152 may be formed in a structure in which sides (left, right, and bottom sides) except a top side thereof are blocked. The wires 150 may be inserted and fixed in an internal space of the wire supporting portion 152.

The wire supporting portion 152 may be formed so as to not obstruct the flow of gas in the vent hole 162. For example, the wire supporting portion 152 may be located to be spaced apart from the vent 20 by a predetermined distance. When the middle cover 100 is coupled to the battery block 1, a predetermined space (i.e., the vent hole 162) may be located between the bottom side of the wire supporting portion 152 and the battery block 1.

When wires from the bus-bars 100a and 100b located at the first side of the middle cover 100 are inserted into the wire hole 130 by way of the wire supporting portions 152, the wires 150 may be spaced apart from the vent hole 162. Accordingly, it may be possible to help prevent the wires 150 from being damaged even when gas is exhausted through the vent hole 162.

The wire supporting portions 152 may be located to respectively correspond to the first and second bus-bars 100a and 100b located at the first side of the middle cover 100. As shown in FIG. 4, each of the wire supporting portions 152 may provide a wire path through which at least one wire 150 can be inserted into the wire hole 130.

Figure 5:
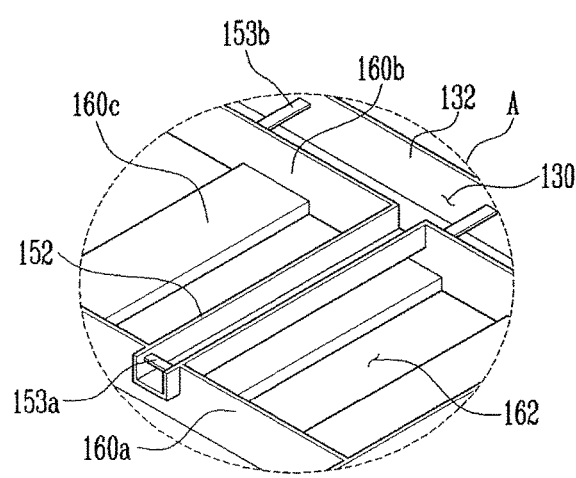
FIG. 5 illustrates an enlarged perspective view showing the portion "A" of FIG. 1 according to an embodiment.

Additionally, as shown FIG. 5, a wire fixing portion 153a that fixes the wire 150 may be further provided to the wire supporting portion 152. The wire fixing portion 153a may extend from a side surface of the wire supporting portion 152, and may be formed to define a predetermined opening through which the wire 150 may be inserted into the wire supporting portion 152. Similarly, a wire fixing portion 153b for fixing the wire 150 inserted into the wire hole 130 may be further formed. The wire fixing portion 153b may extend from the third barrier 132 and/or the second barrier 160b, and may be formed to define a predetermined opening through which the wire 150 may be inserted into the wire hole 130.

Figure 6:
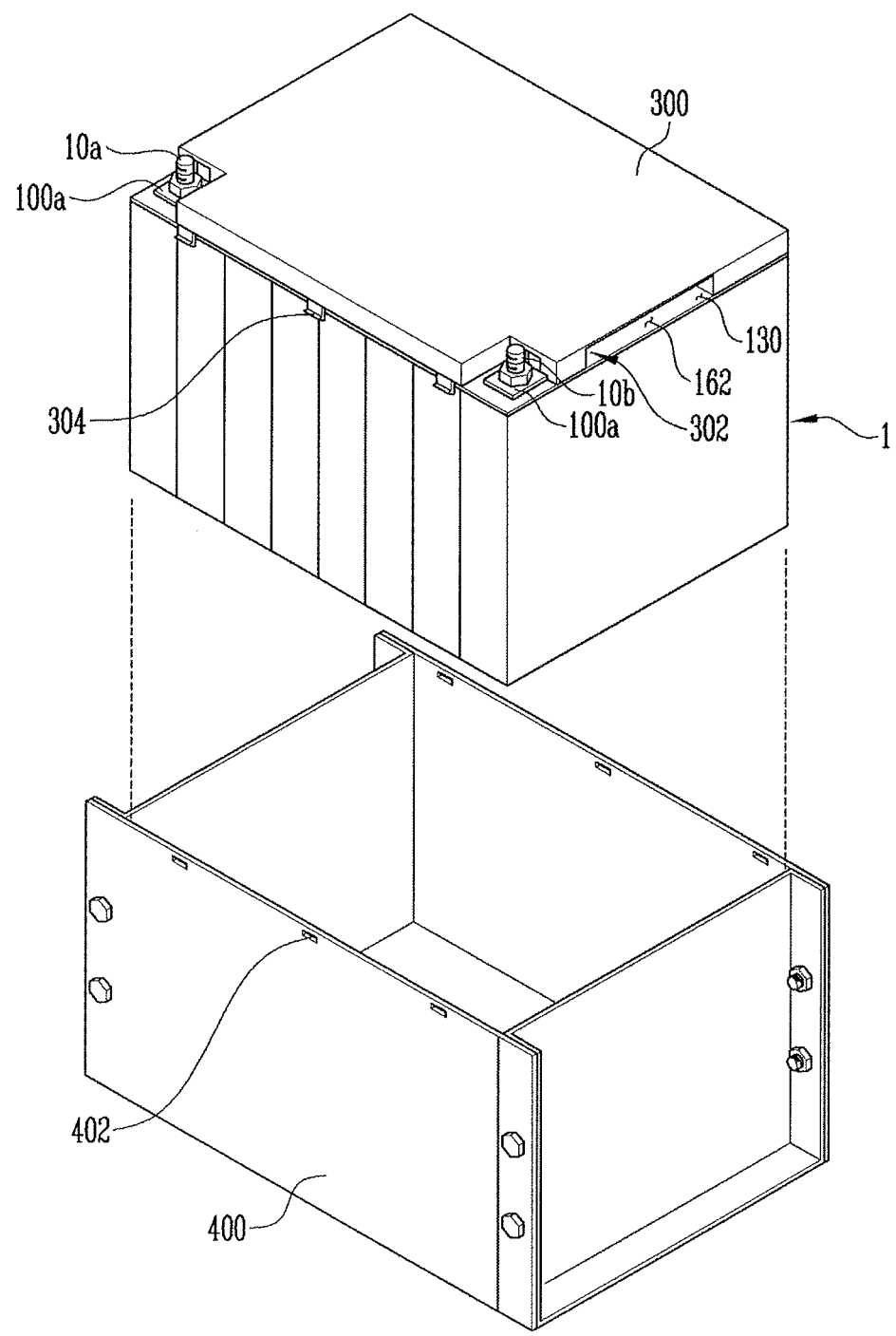
FIG. 6 illustrates a perspective view showing the battery module including an upper cover and a housing.

FIG. 6 illustrates a perspective view showing the battery module including an upper cover and a housing.

Referring to FIG. 6, the battery block 1 is inserted inside a housing 400. In addition, an upper cover 300 may be disposed at a top side of the battery block 1.

The upper cover 300 may be formed to expose the positive electrode terminal 10a, which may be located at the left side of the first side and coupled to the first bus-bar 100a, and the negative electrode terminal 10b, which may be located at the right side of the first side and coupled to the first bus-bar 100a. The upper cover 300 may include a groove 302 through which the vent hole 162 and the wire hole 130 may be exposed to the outside. Thus, gas from the vent hole 162 may be exhausted to the outside through the groove 302, and the wires 150 from the wire hole 130 may be connected to the connector 200.

Additionally, the upper cover 300 may include a plurality of hooks 304. When the upper cover 300 is coupled to the housing 400, each hook 304 may be inserted into a respective groove 402 located at a side surface of the housing 400. Then, the upper cover 300 and the housing 400 may be coupled to each other by the hooks 304 and the grooves 402.

By way of summation and review, when long-time driving and high-power driving are required in an electric vehicle or hybrid vehicle that consumes a large amount of power, a large-capacity battery module may be configured by electrically connecting a plurality of battery cells in order to increase power and capacity. The output voltage or output current of the battery module may be increased according to the number of battery cells built in the battery module.

In a battery module, a vent may be provided in each battery cell. The vent may serve as a path along which, when gas generated inside the battery cell is a predetermined pressure or higher, the gas is exhausted from the battery cell.

A wire that measures a voltage of a battery cell, a wire that measures a temperature of the battery cell, or the like, may be installed in a battery module. In the battery module, the wires may be formed at positions overlapping a vent, and therefore, a risk of fire may exist when gas is exhausted from the vent. For example, when the gas is exhausted from the vent, the coatings of the wires could be damaged and therefore, a fire could occur due to electrical contact between the wires In contrast, in the battery module according to the present disclosure, the wire hole having wires inserted thereinto is formed so as to not overlap the vent hole through which gas is exhausted. In addition, wire supporting portions as connection paths of the wires are additionally formed to traverse the vent hole. Only the top side of the wire supporting portion is opened, and hence the wires inserted inside the wire supporting portion may be isolated from the vent hole. Accordingly, it may be possible to prevent the coatings of the wires from being damaged when gas is exhausted through the vent hole, and a battery module having improved stability may be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery module, comprising:
a battery block including a plurality of battery cells, each including a positive electrode terminal and a negative electrode terminal, and a vent between the positive electrode terminal and the negative electrode terminal; and
a middle cover including a plurality of bus-bars at one edge and at an other edge of the middle cover, the middle cover being connectable to the positive and negative electrode terminals,
wherein the middle cover includes:
a first barrier and a second barrier located such that the vent is between the first barrier and the second barrier; and
a third barrier between the bus-bars located at the other edge and the second barrier, at least one wire supporting portion extending between the first and second barriers at a location that passes between the vents of adjacent ones of the plurality of battery cells, the at least one wiring supporting portion providing a connection path of the wires connected to a connector,
wherein a space between the second and third barriers provides a wire hole into which wires are inserted.

2. The battery module as claimed in claim 1, wherein:
the middle cover includes a predetermined space between the first and second barriers, the predetermined space exposing the vent therethrough, and the predetermined space providing a vent hole through which gas exhausted from the vent is exhaustible to the outside.

3. The battery module as claimed in claim 2, further comprising at least one supporting portion that connects the first and second barriers to each other.

4. The battery module as claimed in claim 1, wherein the third barrier includes a plurality of through-holes such that the wires from the bus-bars disposed at the other edge are insertable therethrough into the wire hole.

5. The battery module as claimed in claim 1, further comprising a wire fixing portion that overlaps the wire hole, the wire fixing portion extending from at least one of the second and third barriers to define an opening into which the wires are insertable.

6. The battery module as claimed in claim 1, wherein the wire supporting portion is in a form of a structure in which left, right, and bottom sides thereof are blocked and a top side thereof is open.

7. The battery module as claimed in claim 6, wherein the bottom side of the wire supporting portion is spaced apart from the battery block by a predetermined distance.

8. The battery module as claimed in claim 1, further comprising a wire fixing portion that extends from a side surface of the wire supporting portion, the wire fixing portion including an opening into which the wires are insertable.

9. The battery module as claimed in claim 1, wherein the bus-bars of the middle cover are fixed to the positive and negative electrode terminals by nuts.

10. The battery module as claimed in claim 1, further comprising:
- a housing accommodating the battery block; and
- an upper cover coupled to the housing at an upper portion of the middle cover by hooks.

* * * * *